Figure 3:
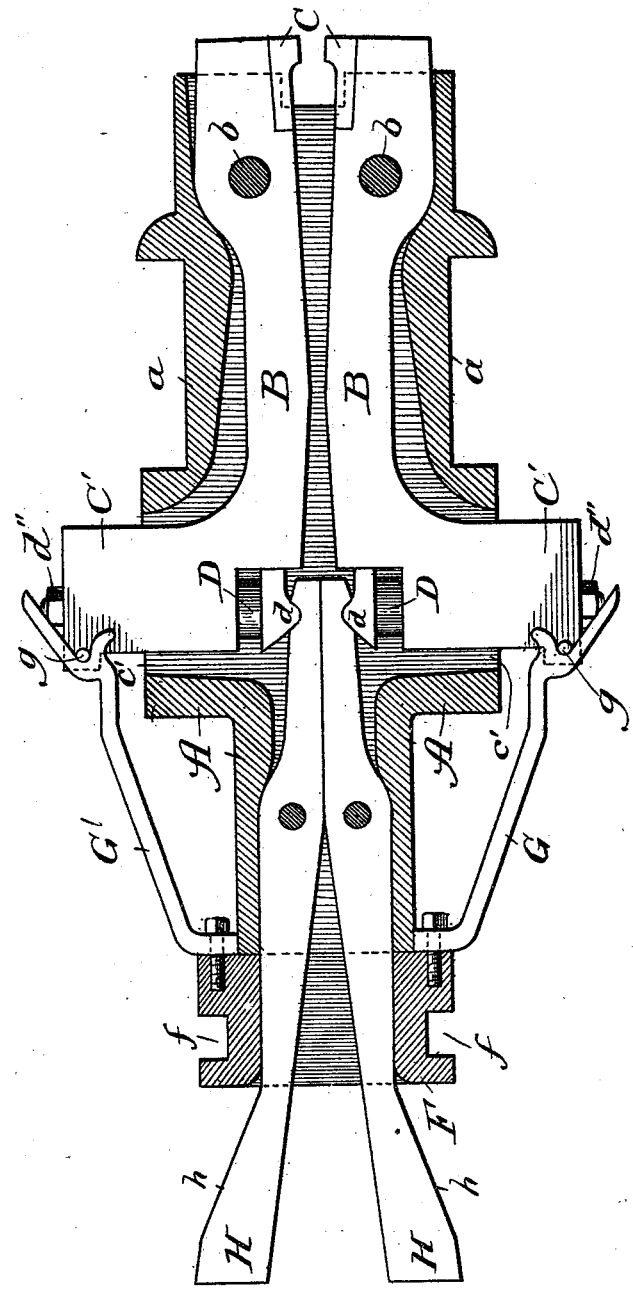

(No Model.) 2 Sheets—Sheet 1.
D. P. JOHNSTON.
CHUCK.
No. 514,008. Patented Feb. 6, 1894.
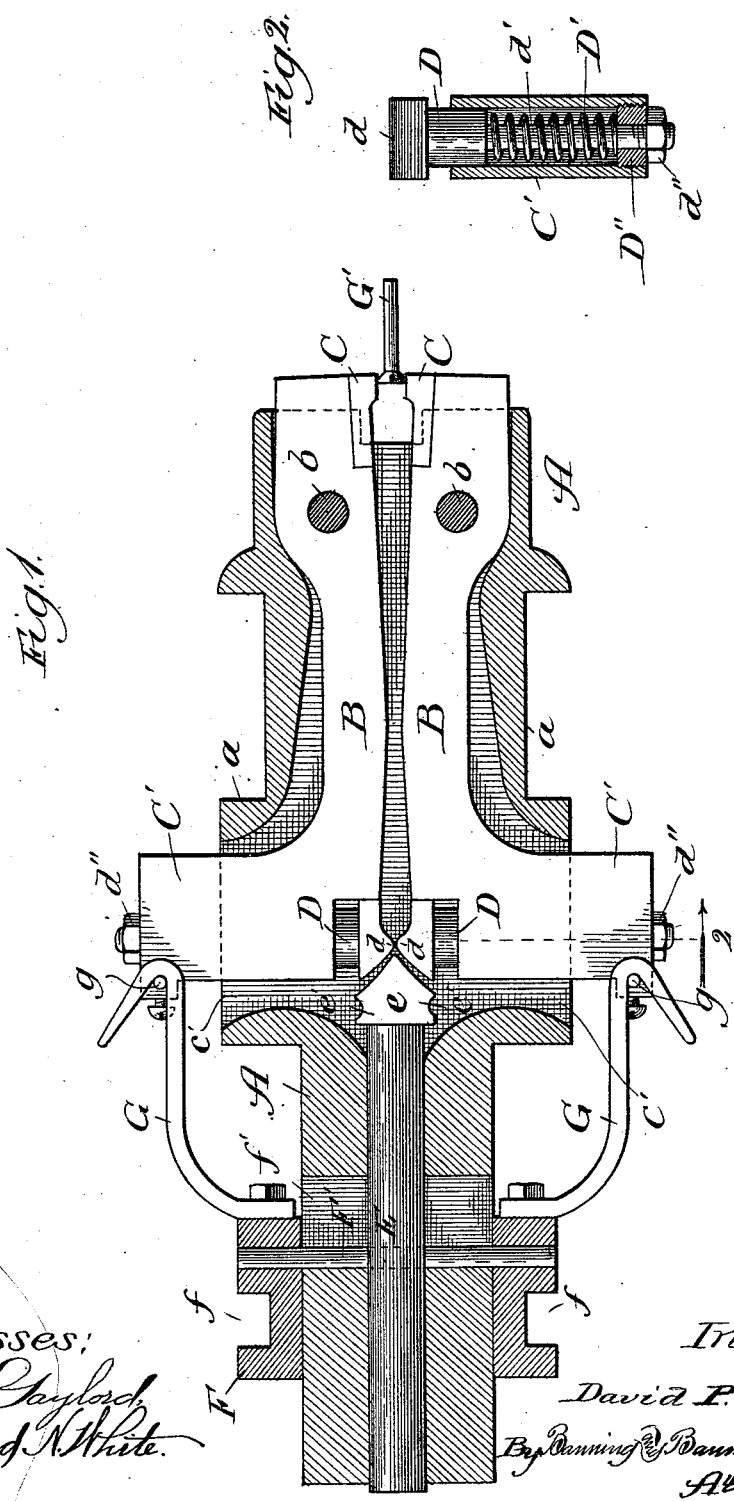

(No Model.) 2 Sheets—Sheet 2.

D. P. JOHNSTON.
CHUCK.

No. 514,008. Patented Feb. 6, 1894.

Witnesses:
Inventor:
David P. Johnston,
By Banning & Banning & Payson,
Att'ys

UNITED STATES PATENT OFFICE.

DAVID P. JOHNSTON, OF CHICAGO, ILLINOIS.

CHUCK.

SPECIFICATION forming part of Letters Patent No. 514,008, dated February 6, 1894.

Application filed April 1, 1892. Renewed July 7, 1893. Serial No. 479,808. (No model.)

*To all whom it may concern:*

Be it known that I, DAVID P. JOHNSTON, a citizen of the United States, residing at Chicago, Cook county, Illinois, have invented certain new and useful Improvements in Chucks, of which the following is a specification.

The object of my invention is to construct a simple and easily operated automatic chuck, which is provided with means for grasping and holding the material to be operated upon, such means being automatically adjustable to objects of various diameters or sizes, and while I shall describe my chuck as used to hold blanks that are being constructed into screws, it will be understood that this illustration is used merely for the sake of brevity and that the chuck, with suitable changes in form and dimensions, may be applied to holding any other object, as desired.

My invention consists in the features, details of construction and combinations hereinafter described and pointed out as new.

In the drawings, Figure 1 is a vertical longitudinal cross section of a chuck constructed in accordance with my invention; Fig. 2, a section on line 2, of Fig. 1, looking in the direction of the arrow, and Fig. 3, a similar view to that shown in Fig. 1, illustrating a modification.

I have not herein shown the lathe or other machine in which the chuck is mounted, since that by itself forms no part of the present invention, and I have not therefore considered it necessary to show it.

In constructing a chuck in accordance with my invention I first make a sleeve or casing A, which is provided with a suitable journal $a$, adapted to be supported in a bearing in the lathe or other machine in which the chuck is used. This sleeve may be made of any suitable dimensions, and while preferably made in the shape shown in the drawings, this shape may be altered as desired, so long as the sleeve is of the proper form and dimensions to accommodate and permit of the efficient working of the jaws and other operative parts of the device. At any suitable point within this sleeve I support upon pivots $b, b$, jaws B, B. These jaws are preferably made in the form shown in the drawings, being provided with dies C, preferably made of hardened steel, and of a form adapted to engage with the article which is to be held between them. At their rearward ends these jaws are provided with arms C', which extend, as shown, out of suitable openings $c'$ in the sleeve. Sliding in these arms are spindles D, shown more particularly in Fig. 2. These spindles are provided with cam shaped heads $d$, beveled upon their rearward faces, as shown. These spindles, at their inner ends, fit closely within holes formed in the arms C', and are then turned down, as shown at $d'$, in order to afford space for a spiral spring D', which abuts, at one end against the larger portion of the spindle, and at the other end against a collar D'', which screws into the lower end of the opening in the arm C'. The spindle passes freely through this collar, and is provided at its lower end with a nut $d''$, which prevents its being drawn out, and by means whereof, in connection with the collar D'', the tension of the spring is adjusted. It will be obvious that when pressure is brought to bear upon the top of these spindles, the arms C' will be forced apart, rocking the clamping ends of the jaws together, and forcing the shoes C upon the article to be held, and that furthermore, the force with which this article is grasped between the jaws will depend to a great extent upon the tension of the springs D', since until the heads $d$ come in contact with the arms C', which they are not intended to do, the only pressure exerted to force the jaws together will be exerted through the springs D' pressing upon the collars D'', which are practically a part of the pivoted jaws. To exert this pressure upon the heads in order to bring the jaws together, I provide the following mechanism: Sliding in the rearward end of the sleeve is a rod E, the head $e$ of which is double beveled, so as to engage with the beveled heads of the spindles. Sliding on the outside of the sleeve is a collar F, connected to the rod E, by means of a key F', which passes through the collar and rod, and works back and forth in a slot $f'$, made in the sleeve to accommodate it. This collar F is preferably, though not necessarily, provided with an annular groove $f$, with which an arm engages in order to move the collar back and forth while the chuck is revolving, so that it is not necessary to stop the machine to open or close the jaws. Secured to this collar are arms or yokes G, which hook over or engage with studs or pins $g$ on the arms C'.

The device having been constructed and put together, as described, operates as follows, supposing the parts to be in the position shown in Fig. 1, and that a screw blank G' has been inserted between the jaws: The collar F being moved toward the right, will force the head $e$ in between the heads $d$, separating them, and through the action of the springs above explained, forcing the left hand ends of the pivoted jaws apart and bringing the right hand ends firmly down against the screw blank. When the head $e$ enters sufficiently far between the heads $d$, the grooved sides $e'$ thereof will hold the heads $d$ apart without any tendency upon their part to force back the rod E, with its head, as would be the case so long as only the beveled faces are in contact. When it is desired to release the blank, the collar F is moved toward the left, withdrawing the head $e$, the heads $d$ being then returned to their normal position by means of the spring D', and the jaws rocked back into their normal position, by means of the hooks on the arms G and the pins $g$.

In Figs. 3 I have shown, as above stated, a modified form of my invention, in which, while maintaining the principles illustrated in Fig. 1, I have slightly altered the mechanism used for forcing together the pivoted jaws. In this form, the sleeve A is made substantially as shown in Fig. 1, except that it is somewhat shortened. The jaws B, B, are pivoted therein in the same manner as above shown, and are provided with the spindles D, carrying the heads $d$, and provided with the springs D', as already shown. I do not, however, in this form, make use of the sliding rod E, with its head, but in place thereof pivot in the left hand end of the sleeve a pair of arms H, the ends of these arms within the sleeve being formed, as shown, to enter between and engage with the heads $d$ on the sliding spindles. Surrounding these arms and adapted to slide upon them, is a collar F'', somewhat similar in construction to the one shown in Fig. 1. This collar is beveled near its outer end, as shown, engaging with beveled faces $h$ on the arms H. This collar also carries hooks G', engaging with pins $g$ on the arms C'. The operation of this form of device is as follows, supposing the parts to be in the position shown in Fig. 3: A screw blank being inserted between the jaws, the sleeve F is moved toward the left. This forces together the outer ends of the arms H, forcing apart their inner ends. As these inner ends are forced apart, they will tend to separate the heads $d$, and will rock the pivoted jaws to grasp the screw blank in precisely the same manner as this blank was grasped when the jaws were separated by means of the beveled head $e$ of Fig. 1. Moving the sleeve F toward the right will release the outer ends of the arms H, and the springs D' will then restore the spindles to their normal position, the pivoted jaws being restored to such position by means of the hooks engaging with the pins $g$. By this means I provide an exceedingly efficient chuck which is adapted to grasp and firmly hold the devices intended to be operated upon, and which will furthermore, while grasping the devices firmly, do so in a somewhat adjustable manner, owing to the elasticity of the springs D', which, as above stated, are the principal agents in forcing the jaws together. This adjustability has the advantage that thereby devices of various sizes and diameters may be grasped and held without changing the jaws of the chuck. If the springs D' have not sufficient tension to accomplish the desired purpose, the tension may be increased by screwing up the collars D'' and the nuts $d''$.

While I have described more or less precise forms, I do not intend to limit myself unduly thereto, but contemplate changes in form, proportions, and the substitution of equivalent members, as may be desirable or necessary.

I claim—

1. In a chuck, the combination of a sleeve, jaws pivoted in such sleeve, spindles sliding in such jaws normally forced out by springs, and means for forcing in such spindles against the pressure of the springs to rock the jaws together, substantially as described.

2. In a chuck, the combination of a sleeve, jaws pivoted therein and provided with arms extending out therefrom, spindles sliding in such arms and provided with beveled heads, springs normally forcing such spindles out of the arms, a rod sliding in such sleeve and provided with a beveled head adapted to engage with the heads on the spindles, and means for moving this rod to force its head between the heads on the spindles to bring the jaws together, substantially as described.

3. In a chuck, the combination of a sleeve, jaws pivoted therein and provided with arms extending out therefrom, spindles sliding in such arms and provided with beveled heads, springs normally forcing such spindles out of the arms, a rod sliding in such sleeve and provided with a beveled head adapted to engage with the heads on the spindles, means for moving this rod to force its head between the heads on the spindles to bring the jaws together, and means connected to the rod whereby when the rod is withdrawn the parts are restored to their normal position, substantially as described.

4. In a chuck, a pair of pivoted jaws, spindles sliding in such jaws normally forced out by springs interposed between the spindles and the jaws, and means for forcing in the spindles against the tension of the springs, whereby the jaws are clamped upon the object to be held with a force proportional to such tension, substantially as described.

5. In a chuck, a pair of pivoted jaws, spindles sliding in such jaws normally forced out by means of springs, said springs abutting at one end against the spindles and at the other against adjustable collars in the jaws, whereby the tension of such springs may be regulated, and means for forcing in the spindles against the tension of the springs to bring the jaws together, substantially as described.

6. In a chuck, the combination of a sleeve, jaws pivoted therein, spindles sliding in the jaws provided with heads, arms pivoted within such sleeve, their inner ends being interposed within the heads of the spindles, and a sliding collar for separating the inner ends of such arms to act upon the spindles and clamp the jaws together, substantially as described.

7. In a chuck, the combination of a sleeve, jaws pivoted therein, spindles sliding in the jaws provided with heads, arms pivoted within such sleeve, their inner ends being interposed within the heads of the spindles, a beveled collar sliding upon the outer ends of such arms and engaging with beveled faces thereon, whereby as the collar is moved in one direction the outer ends of the jaws will be brought together separating the inner ends, and acting, by means of the spindles and springs, to force together the clamping jaws, and means connected with the collar whereby when such collar is moved back the parts will be restored to their normal position, substantially as described.

8. In a chuck, the combination of a sleeve, jaws pivoted in such sleeve and provided with arms extending out of the same, spindles sliding in such arms provided with beveled heads, springs within the arms abutting at one end against the spindles and at the other end against adjustable collars in the arms, a rod sliding in the sleeve and having a beveled head adapted to engage with the heads on the spindles, a collar sliding on the outside of the sleeve connected to the rod and provided with hooks engaging with pins on the arms, whereby when this collar is moved in one direction the head on the rod will be forced between the heads on the spindles to rock the jaws together, and when the collar is moved in a contrary direction the head on the rod will be withdrawn and the parts restored to their normal position substantially as described.

DAVID P. JOHNSTON.

Witnesses:
EPHRAIM BANNING,
SAMUEL E. HIBBEN.